UNITED STATES PATENT OFFICE.

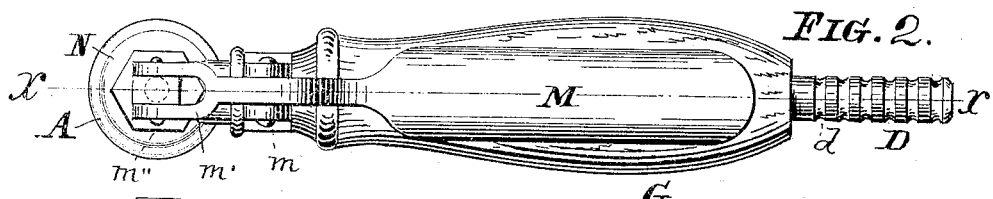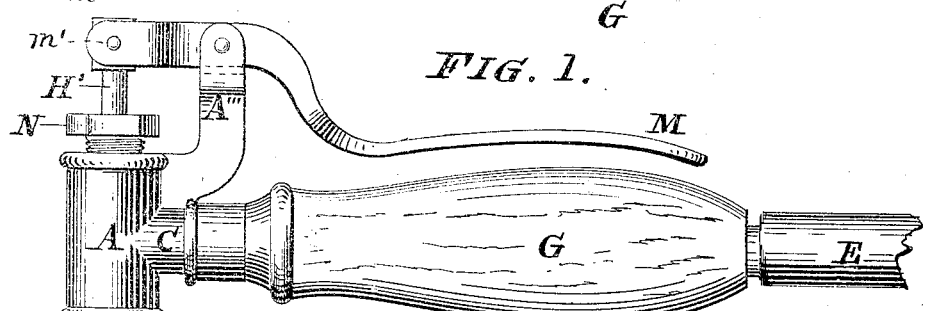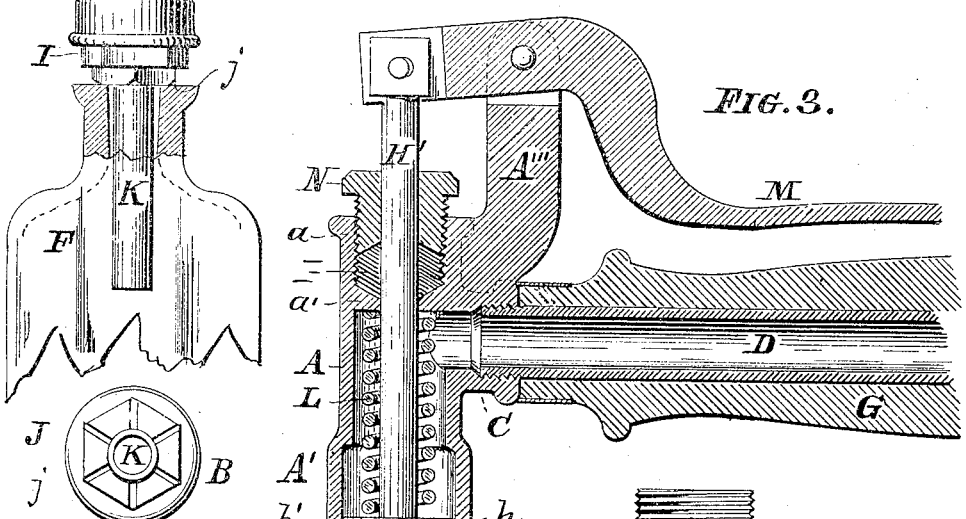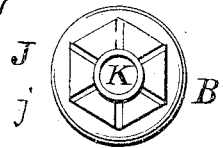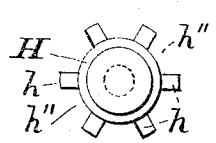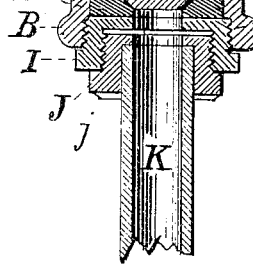

LEWIS WHITTON, OF CHICAGO, ILLINOIS, ASSIGNOR TO CHARLES E. FOLEY, OF CHICAGO, ILLINOIS.

BOTTLE-FILLING DEVICE.

932,362.

Specification of Letters Patent.     Patented Aug. 24, 1909.

Application filed March 5, 1908. Serial No. 419,372.

*To all whom it may concern:*

Be it known that I, LEWIS WHITTON, a citizen of the United States, and a resident of Chicago, in the county of Cook, in the State of Illinois, have invented certain new and useful Improvements in Bottle-Filling Devices; and I do hereby declare that the following description of my said invention, taken in connection with the accompanying sheet of drawings, forms a full, clear, and exact specification, which will enable others skilled in the art to which it appertains to make and use the same.

This invention has general reference to improvements in bottle-filling devices; and especially that class in which the apparatus containing the valve which controls the flow of liquid from a reservoir to the receptacles to be filled, is carried in the hand of the operator; and it consists, essentially, in the novel and peculiar combination of parts, and details of construction, as hereinafter first fully set forth and described, and then pointed out in the claims.

In the drawings already mentioned, which serve to illustrate this invention more fully, Figure 1 is an elevation of this improved bottle-filling device. Fig. 2 is a plan of the same. Fig. 3 is a longitudinal sectional elevation in line *x x* of Fig. 2. Fig. 4 is an inverted plan of the lower portion of the device. Fig. 5 is a similar view of the valve detached, and Fig. 6 is an elevation of one of the filling tubes detached.

Like parts are designated by corresponding letters of reference in all the figures.

The object of this invention is the production of an efficient, serviceable and durable device for rapidly filling bottles of all sizes with liquids, such as medicine-bottles, liquor-bottles, and in fact all receptacles adapted to receive liquids of all kinds. To attain this object I construct the device of a cylindrical hollow casing A, bell-shaped at its lower end B, both ends of this casing being internally screw-threaded at *a* and *b*, respectively, for the purpose hereinafter to be referred to. This casing A has a branch C, which is also internally screw-threaded to receive a tube D, the outer end of which is provided with a series of grooves *d*, and it is adapted to receive a flexible hose E, by means of which the liquid to be poured into the bottle F is conducted from any suitable reservoir, (not shown,) to the interior or chamber A', of the casing A. Over this tube C is placed a handle G, by which the device is carried about.

In the chamber A' there is a shoulder *b'*, against which is placed a slightly elastic ring B', which serves as a seat for a valve H, this ring B' being removably retained in position by a nut I, which is internally threaded to receive an externally screw-threaded bushing J, to which is permanently affixed a filling-tube K.

The chamber A' is internally bored, and the valve H is provided with laterally-projecting lugs *h*, by means of which the valve H is properly guided within the chamber A', the interstices *h''* between the lugs *h* forming passages for the liquid from the chamber A' into the filling-tube K. In the chamber A' there is a partition *a''*, having a central bore for the passage of the valve-rod H' which is screwed or otherwise secured to the valve H, and it is surrounded by a coil-spring L, which normally seats the valve upon the ring B'. It is lifted by means of a lever M, which has its fulcrum in a bracket A''', by a pin or bolt *m*, said lever having at its end a fork *m'* which engages the valve-rod H' by a pin or bolt *m''*. This lever M is curved as shown in Figs. 1 and 3, to bring its long arm into close proximity to the handle G, so that the person holding the device in his or her hand may open the valve by simply closing the hand.

The bushing J has on its lower face a series of grooves *j*, serving as escape-passages for air from the bottle F when being filled. The tubes K attached to these bushings are of various diameters so that bottles of all sizes may be rapidly filled with this device, it being advisable to always use the largest size of tube that can be inserted into the neck of the bottles to be filled, the change being made by unscrewing the bushing J with its attached tube from the nut I and substituting the proper bushing J and its tube K in place thereof.

The upper, internally screw-threaded end of the casing A is provided with a packing-nut N, and the space between this packing-nut and the partition *a'* is filled with a suitable packing P, to hermetically seal the upper end of the chamber A'.

The operation of this device is extremely simple: The operator takes hold of the device by the handle G and places the filling tube K into the neck of the bottle to be filled.

These bottles are placed into trays, a number thereof at a time, and by closing the hand the operator depresses the lever M which causes the valve H to lift and the liquid to pass from the chamber A' into the bottle F. Relaxing the hand and lifting the device to withdraw the tube K from the bottle completes the operation which is successively carried on from bottle to bottle, which are rapidly filled without waste, it being a fact that a skilled operator can fill many thousands of bottles in a working day.

This device is preferably made of, or coated in its interior with, a metal not affected by acids or alkalies, such as tin &c., and it being comparatively simple, it can be produced at a reasonable cost.

The ring B' against which the valve H seats, is made of a slightly elastic material, such as fiber &c., and it being removably held in position, it can be readily removed for cleansing the interior when changing from one kind of liquid to another, or for renewing when worn.

Having thus fully described my invention, I claim as new and desire to secure to me by Letters Patent of the United States:

1. A bottle filler, comprising in combination a casing having a radial conduit, at its upper end, a valve seat threaded in its lower end, a valve closing said valve seat and having a stem projected through the top of said casing, a vertical standard formed at one side of the upper end of said casing, a hand lever pivoted to said standard and connected to said stem, a coil spring inclosing said stem and bearing between the upper end of said casing and said valve to maintain the latter normally seated, and a hand grip surrounding said conduit adjacent said casing and underlying said hand lever to permit said grip and said lever to be simultaneously grasped in one hand.

2. A bottle filler comprising in combination, a casing having an enlarged chamber formed in its lower end, a valve seat threaded into the lower end of said chamber, a valve normally resting on said seat, a stem connected to said valve and projecting through the upper end of said casing, a conduit connected to said casing at its upper end and communicating with said chamber, a vertical standard formed at one side of said casing at the upper end thereof, a hand lever fulcrumed on said standard and operatively connected with said valve stem to reciprocate said valve, and a hand grip surrounding said conduit adjacent said casing and underlying said hand lever to permit said grip and said lever to be simultaneously grasped in one hand.

In testimony that I claim the foregoing as my invention I have hereunto set my hand in the presence of two subscribing witnesses.

LEWIS WHITTON.

Attest:
CHAS. R. FOLEY,
MICHAEL J. STARK.